(12) United States Patent
Shrivastava et al.

(10) Patent No.: US 12,040,703 B2
(45) Date of Patent: Jul. 16, 2024

(54) HIGH EFFICIENCY POWER OBFUSCATION SWITCHED CAPACITOR DC-DC CONVERTER ARCHITECTURE

(71) Applicant: Northeastern University, Boston, MA (US)

(72) Inventors: Aatmesh Shrivastava, Boston, MA (US); Nikita Mirchandani, Allston, MA (US)

(73) Assignee: Northeastern University, Boston, MA (US)

( * ) Notice: Subject to any disclaimer, the term of this patent is extended or adjusted under 35 U.S.C. 154(b) by 246 days.

(21) Appl. No.: 17/697,087

(22) Filed: Mar. 17, 2022

(65) Prior Publication Data

US 2022/0302830 A1 Sep. 22, 2022

Related U.S. Application Data

(60) Provisional application No. 63/162,716, filed on Mar. 18, 2021.

(51) Int. Cl.
*H02M 3/07* (2006.01)
*G06F 21/75* (2013.01)
(Continued)

(52) U.S. Cl.
CPC .......... *H02M 3/07* (2013.01); *G06F 21/755* (2017.08); *H02M 1/0003* (2021.05); *H04L 9/003* (2013.01)

(58) Field of Classification Search
CPC ........ H02M 3/073; H02M 3/07; H02M 3/077; H02M 3/33592; H02M 3/338; H02M 1/0003; H02M 1/0048; H02M 3/072; H02M 5/4505; H02M 7/527; H04L 9/002; H04L 9/003; H04L 9/004; H04L 9/005

See application file for complete search history.

(56) References Cited

U.S. PATENT DOCUMENTS

| 10,903,738 | B2 * | 1/2021 | Zhang | H02M 1/08 |
| 11,043,893 | B1 * | 6/2021 | Pelicia | H03K 5/2472 |

(Continued)

OTHER PUBLICATIONS

Matthew Mayhew, Integrated Capacitor Switchbox for Security Protection, 2012, IEEE (Year: 2012).*

*Primary Examiner* — Gustavo A Rosario-Benitez
(74) *Attorney, Agent, or Firm* — Foley Hoag LLP; Dana M. Gordon; Lee Chedister

(57) ABSTRACT

Side channel attacks (SCA) such as correlation power analysis (CPA) have been demonstrated to be very effective in breaking cryptographic engines. The inherent dependence of the power consumption on the secret key can be exploited by statistical analysis to retrieve the key. Various embodiments disclosed herein relate to a new power obfuscation switched capacitor (POSC) DC-DC converter design, which can conceal the leakage of information through power consumption. It works by adding an extra phase to the conventional two-phase switched capacitor (SC) converter, during which a part of the charge from the flying capacitor is extracted and stored on a storage capacitor. This guarantees that the same amount of charge is drawn from the input power supply in each cycle. The design was successfully evaluated by analyzing the power supply to an Advanced Encryption Standard (AES) unit powered by the converter.

20 Claims, 13 Drawing Sheets

(51) Int. Cl.
    *H02M 1/00*     (2007.01)
    *H04L 9/00*     (2022.01)

(56) References Cited

U.S. PATENT DOCUMENTS

| | | | |
|---|---|---|---|
| 2014/0167837 A1* | 6/2014 | Yannette | G09C 1/00 |
| | | | 327/534 |
| 2014/0181534 A1* | 6/2014 | Nowottnick | G06F 21/755 |
| | | | 713/192 |
| 2015/0110265 A1* | 4/2015 | Wostyn | G06F 21/755 |
| | | | 380/28 |
| 2015/0309518 A1* | 10/2015 | Nagda | G05F 1/468 |
| | | | 323/274 |
| 2016/0132070 A1* | 5/2016 | Bode | H03K 3/023 |
| | | | 327/294 |
| 2017/0195114 A1* | 7/2017 | Martin | G06F 21/755 |
| 2017/0222547 A1* | 8/2017 | Haiut | H02M 3/07 |
| 2019/0007223 A1* | 1/2019 | Vaidya | H04L 9/0618 |
| 2021/0336536 A1* | 10/2021 | Kudva | G06F 21/755 |
| 2022/0209660 A1* | 6/2022 | Sun | H02M 3/158 |

\* cited by examiner

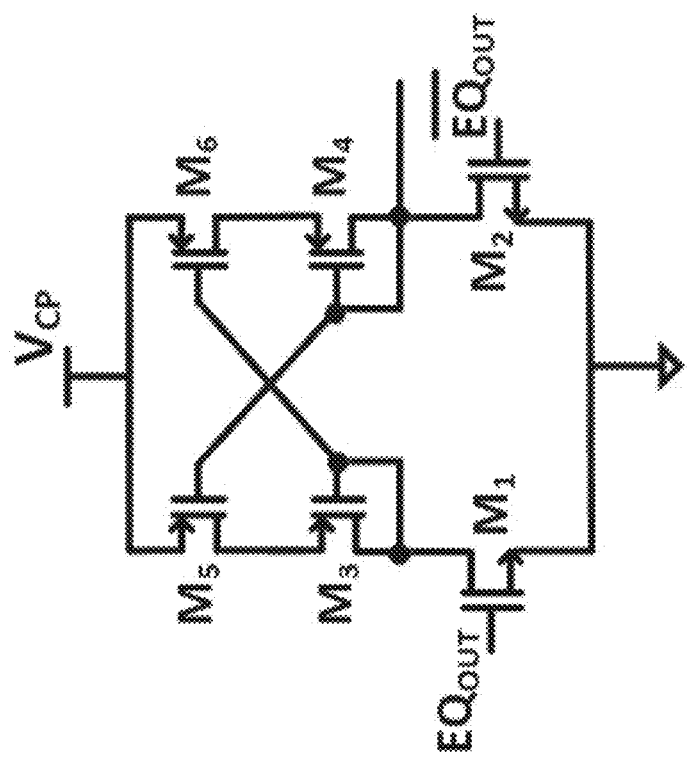
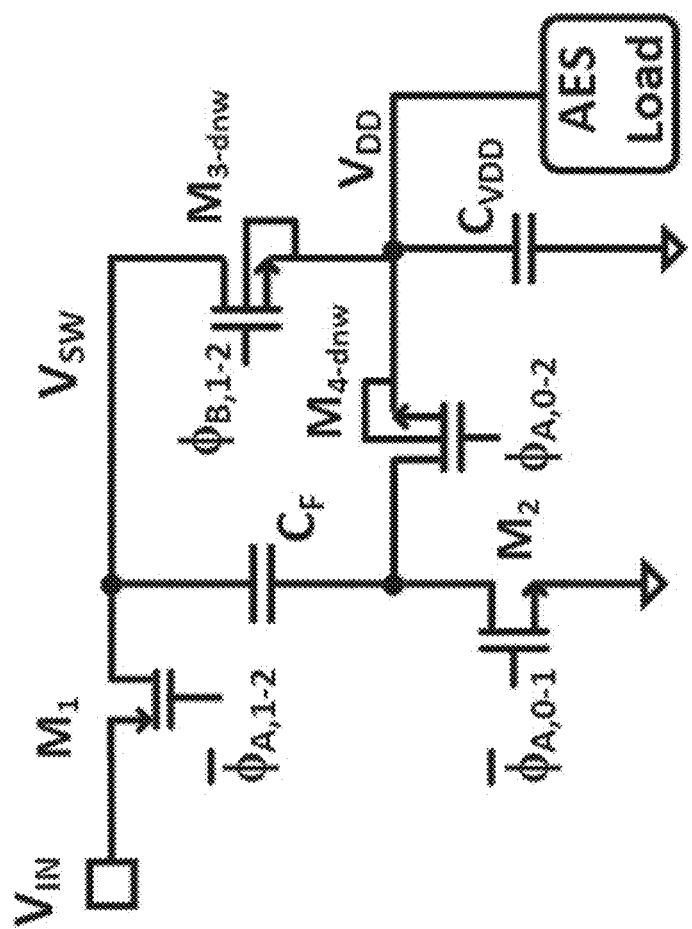
FIG. 3B
FIG. 3A

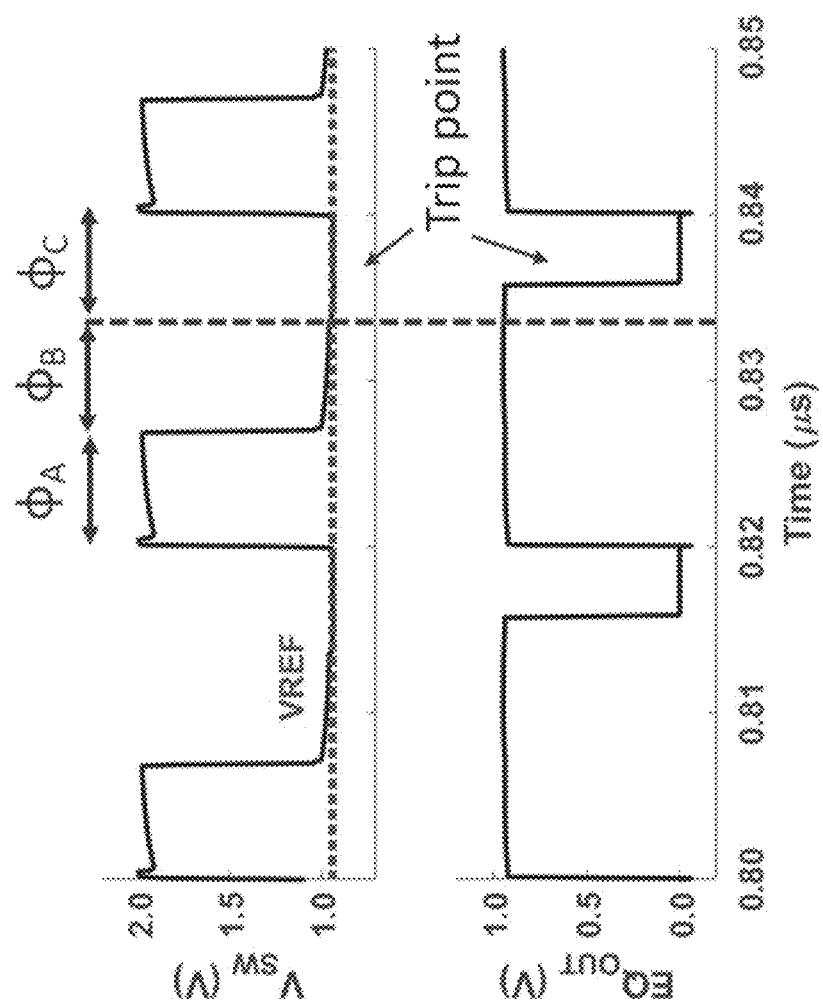

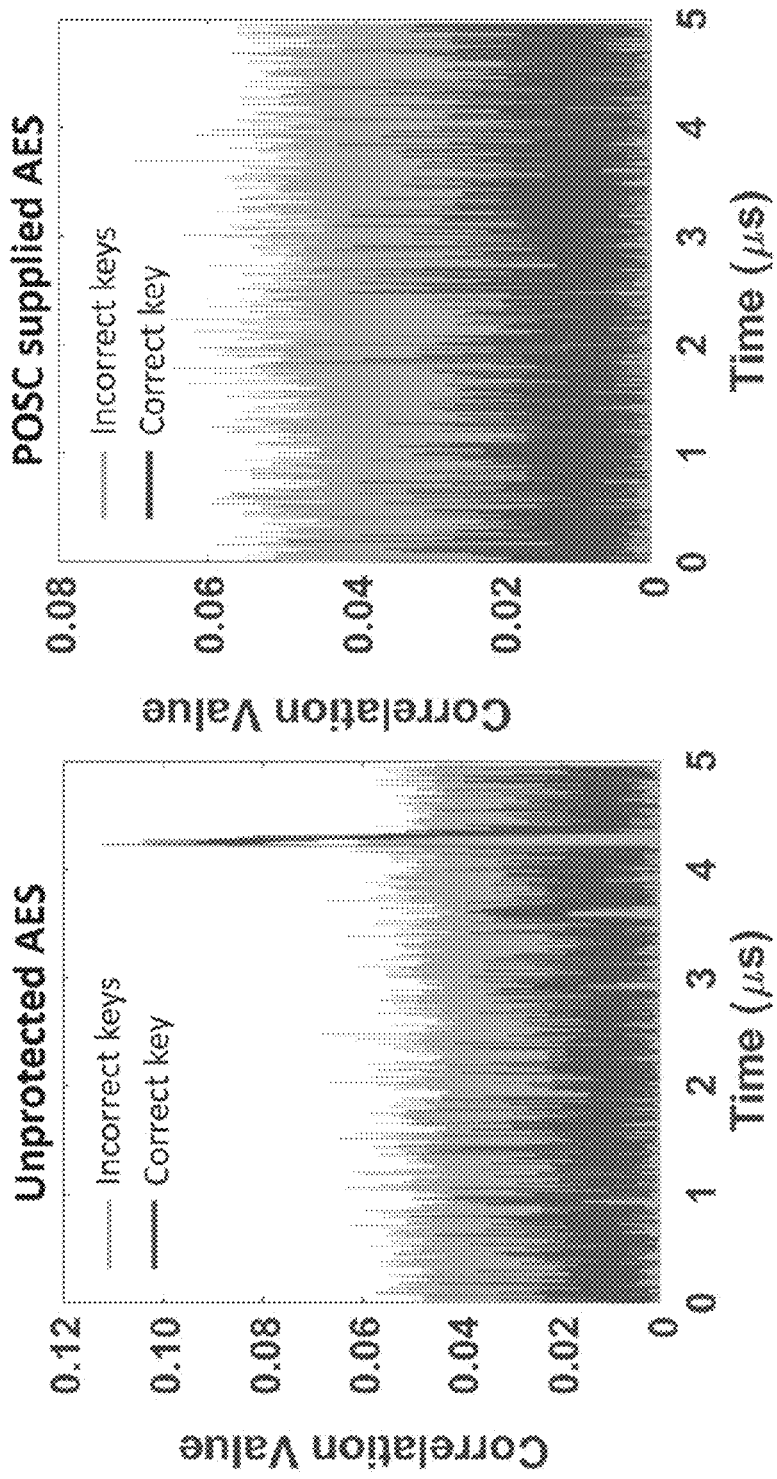

TABLE I: Key design parameters for POSC

| $C_F$ | $C_{ST1,2}$ | $C_{CP1}$ | $C_{CP2}$ | $C_{VDD}$ | $V_{IN}$ | $V_{DD}$ | $V_{REF}$ |
|---|---|---|---|---|---|---|---|
| 150pF | 13pF | 3pF | 6.5pF | 2nF | 2V | 0.95V | 0.936V |

FIG. 10

TABLE II: Performance comparison of proposed POSC converter with state-of-the-art SCA Countermeasures

| | JSSC'10 [8] | CICC'20 [14] | JSSC'20 [15] | TCAS'18 [16] | VLSI'15 [7] | DATE'18 [17] | This work* |
|---|---|---|---|---|---|---|---|
| Tech. (nm) | 130 | 65 | 130 | 130 | 65 | 130 | 65 |
| Topology | 1:1-SC | CDSA | Digital LDO | ASNI | BBL | IVR + ADCM | POSC |
| Attack Type | DPA | ML-SCA | CPA,TVLA | CPA | DPA | CPA,TVLA | CPA |
| Crypto Algorithm | AES-128 | AES-256 | AES-128, SIMON-128 | AES-128 | AES-128 | AES-128 | AES-128 |
| AES Power | 33.3mW | 0.8mW | 10.9mW | 1mA | 138mW | 10.5mW | 6mW |
| Frequency | 100MHz | 50MHz | 80MHz | 40MHz | 1.32GHz | 40MHz | 3MHz |
| Area Overhead | 25% | 36.7% | 36.9% | 1.6× | 25% | 2135$\mu m^2$ | 14% |
| Power Overhead | 33% | 49.8% | 32% ($\eta = 68\%$) | 1.68× ($\eta = 60\%$) | 80% | 5% ($\eta = 71\%$) | 13% ($\eta = 77\%$) |
| Supply Noise/Ripple | 100mV | N/A | 80mV | 40mV | N/A | 5mV | 27mV |
| MTD | >10M | >10M | 0.8M | 1M | 0.52M (mean) | >1.5M | >5K |

*Simulation-based Results

FIG. 11

HIGH EFFICIENCY POWER OBFUSCATION SWITCHED CAPACITOR DC-DC CONVERTER ARCHITECTURE

CROSS REFERENCE TO RELATED APPLICATION

This application claims priority from U.S. Provisional Patent Application No. 63/162,716 filed on Mar. 18, 2021 entitled SIDE-CHANNEL POWER OBFUSCATION TECHNIQUES USING CHARGE-EQUALIZING ON-CHIP SWITCHED CAPACITOR CONVERTERS, which is hereby incorporated by reference.

BACKGROUND

With the proliferation of Internet-of-things (IoT) devices, massive amounts of real-time and sensitive data are being generated in various applications and infrastructures. Confidentiality for data-at-rest and data-in-transit has to be ensured by cryptographic algorithms and protocols. For example, AES (Advanced Encryption Standard) is a widely used standard symmetric-key cipher and RSA is the standard public-key cipher. Considering the resource constraints of many IoT devices, cryptographic operations are often implemented in hardware accelerators to serve as security engines. However, unprotected implementations of cryptographic security engines show vulnerabilities to side-channel attacks (SCAs), which leverage the physical parameters of system execution, such as power consumption [1], timing [2], and electromagnetic emanations [3], to infer the secret. The fundamental information leakage stems from the dependency of the side-channel signals on the secret (data dependency). The most commonly used side-channel leakages for hardware engines is power consumption. SCAs using power leakage can be further categorized as Simple Power attack (SPA), Differential Power Analysis (DPA), and Correlation Power attack (CPA), among other methods.

DPA was first introduced in [1], where it was found that the power consumption of physical devices is dependent on the data (input and key) being processed, and can be leveraged by statistical analysis to retrieve the secret. In a DPA, a suitable power model for the hardware platform is assumed, which associates the power consumption with the cryptographic operations and data. Power consumption traces for the system execution with different inputs are collected.

Correlations between the model-predicted power consumptions under different key guesses and the measured power consumptions are calculated, and the highest correlation will reveal the correct key guess. For a long key (e.g., 128-bit for AES encryption), mathematical cryptanalysis fails due to the prohibitive enumeration complexity. However, the dependency of side-channel leakage on individual key bytes enables DPA to retrieve the key byte-by-byte. DPA is a powerful noninvasive attack, and generally applies to any unprotected cryptographic implementations [4]-[6].

Several circuit-level countermeasures against power analysis attacks have been proposed. Charge recycling secure adiabatic logic [7] has been successfully used to prevent DPA attacks. However, adiabatic logic design incurs high area overhead. Switched-capacitor current equalizers were first proposed in [8]. The technique uses a capacitor array, which is charged from the external supply, and then isolated while it provides charge to the sensitive AES unit. The capacitor array is discharged to a known voltage before connecting it to the external supply as shown in FIG. 1B. This way, the current drawn from the external supply is independent of the AES power requirements. The design incurs a power overhead of 33%. The intermittent-driven current equalizer in [9] achieves 11× power overhead savings by remaining active only during rounds that may still be susceptible to power analysis attacks.

Various embodiments disclosed herein relate to a new power obfuscation switched capacitor (POSC) converter that prevents side-channel leakage by drawing the same amount of charge from the input in each switching cycle, regardless of variations in the load. To achieve higher efficiency, a charge recycling technique is also disclosed. Simulations on 5 k AES load current traces did not reveal any byte of the secret key after CPA.

BRIEF SUMMARY OF THE DISCLOSURE

In accordance with one or more embodiments, a power obfuscation switched capacitor (POSC) converter operable in a plurality of switching cycles for concealing power consumption by an encryption unit load is disclosed. Each of the switching cycles comprises a first phase, a second phase, and a third phase. The POSC converter includes a switched capacitor converter including a flying capacitor for drawing charge from an input voltage in the first phase to power the encryption unit load in the second phase. A charge-equalization circuit is coupled to the switched capacitor converter and configured to bring the voltage level of the flying capacitor to a fixed reference voltage value by extracting charge from the flying capacitor in the third phase to equalize the charge drawn by the switched capacitor converter from the input voltage in each switching cycle. A charge-recycling circuit is coupled to the switched capacitor converter and the charge-equalization circuit to store and recycle the charge extracted from the flying capacitor in the third phase to reduce power loss and improve efficiency.

In accordance with one or more further embodiments, a method is disclosed for concealing power consumption by an encryption unit load using a power obfuscation switched capacitor (POSC) converter operable in a plurality of switching cycles. Each of the switching cycles comprises a first phase, a second phase, and a third phase. The method comprises the steps of: (a) drawing charge by a switched capacitor converter having a flying capacitor from an input voltage in the first phase to power the encryption unit load in the second phase; (b) bringing the voltage level of the flying capacitor to a fixed reference voltage value by extracting charge from the flying capacitor in the third phase to equalize the charge drawn by the switched capacitor converter from the input voltage in each switching cycle using a charge-equalization circuit; and (c) storing and recycling the charge extracted from the flying capacitor using a charge-recycling circuit in the third phase to reduce power loss and improve efficiency.

BRIEF DESCRIPTION OF THE DRAWINGS

FIG. 3A shows implementation of a conventional 2:1 converter. FIG. 3B shows a level converter circuit implementation.

FIG. 4B shows transient waveforms of the control logic and comparator signals.

FIGS. 8A and 8B show the correlation coefficient of correct and incorrect keys as a function of time. FIG. 8A shows the CPA analysis for an unprotected AES unit. FIG. 8B shows the CPA analysis for AES supplied by a POSC converter.

FIG. 9A shows the CPA analysis for an unprotected AES unit. FIG. 9B shows the CPA analysis for AES supplied by a POSC converter.

FIG. 10 shows Table I.
FIG. 11 shows Table II.

DETAILED DESCRIPTION

Side channel attacks (SCA) such as correlation power analysis (CPA) have been demonstrated to be very effective in breaking cryptographic engines. The inherent dependence of the power consumption on the secret key can be exploited by statistical analysis to retrieve the key. The present application relates generally to a new power obfuscation switched capacitor (POSC) DC-DC converter design, which can conceal the leakage of information through power consumption. It works by adding an extra phase to the conventional two-phase switched capacitor (SC) converter, during which a part of the charge from the flying capacitor is extracted and stored on a storage capacitor. This guarantees that the same amount of charge is drawn from the input power supply in each cycle. The design was evaluated by analyzing the power supply to an Advanced Encryption Standard (AES) unit powered by the proposed converter. CPA fails even with 50 times more power traces than what are needed to break an unprotected AES unit. The three-phase POSC has an efficiency of 77% compared to the 90% efficiency of a conventional two-phase converter.

The first step in alleviating side channel power leakage is to separate the AES power supply by integrating it on-chip, which cannot be accessed externally. Side channel power leakage is then hidden by modifying existing architectures of on-chip power supplies. These include inductive voltages regulators (IVR), digital and analog low drop-out regulators (LDOs), and switched capacitor (SC) converters. IVRs integrate inductors and capacitors on-chip or in package to hide the AES supply [10], [11], but incur high area and cost overhead. A digital low dropout regulator is used in [12] as a countermeasure against SCA. The digital LDO introduces a current transformation, which suppresses side channel leakage. Quantization noise also introduces an element of randomness, and hence contributes towards suppressing leakage. In [13], a shunt regulator is used to suppress the AES current signature.

Figure 1A:
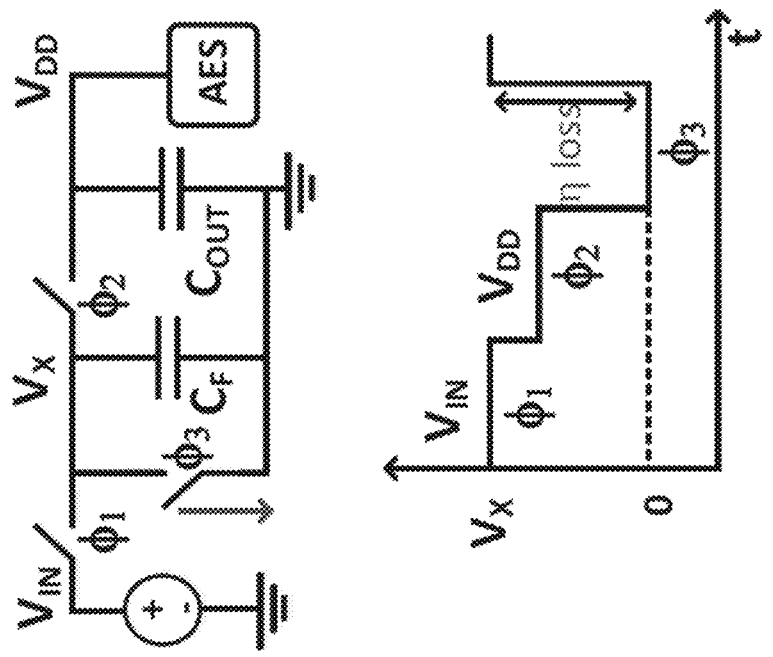
FIG. 1A shows a conventional SC converter's vulnerability to Differential Power Analysis (DPA) attacks.

SC converters have not been extensively explored for power obfuscation. SC converters are a better alternative for power obfuscation as they are easily integrated, achieve high power density, and can provide high efficiency at lighter loads. However, a conventional design of an SC converter can easily reveal the load current patterns. FIG. 1A shows the charge transfer operation in a typical SC converter. The converter works in two phases. In the phase $\varnothing_1$, one or more flying capacitors are charged by connecting it to the input voltage. In phase $\varnothing_2$, the flying capacitor is connected to the output capacitor ($C_{OUT}$), which provides current to the load when $C_F$ is disconnected from the external supply. In phase $\varnothing_2$, $C_F$ loses a part of the charge to the load, which is replenished in the next cycle. Since $C_F$ is directly connected to the load in phase $\varnothing_2$, it carries information about the load current through sampling. Specifically, the charge drawn from $C_F$ in phase $\varnothing_2$ is proportional to the load current. When $C_F$ reconnects with the input in the next cycle, the load current information carried by $C_F$ is available at the input node, which can be probed by the attacker. Hence, conventional SC converters have inherent vulnerability to power analysis attacks.

Figure 1B:
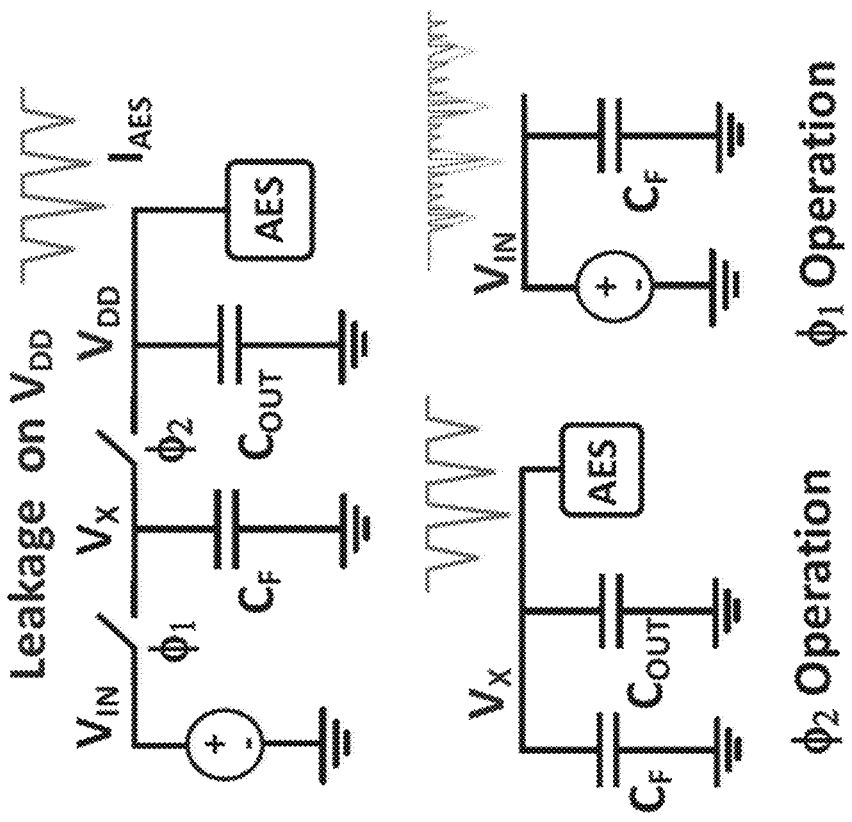
FIG. 1B shows a modified converter with shunt switch to prevent leakage.

Additional security against power analysis can be achieved by discharging the flying capacitor in each cycle to ground similar to the approach used in [8]. FIG. 1B shows this operation. As the flying capacitor is discharged, the switching information is lost which prevents the side-channel leakage. This ensures that the same amount of charge is drawn from the input in each cycle. However, recharging the flying capacitor in phase $\varnothing_1$ leads to increased charge transfer losses, thereby significantly degrading the efficiency.

Figure 2A:
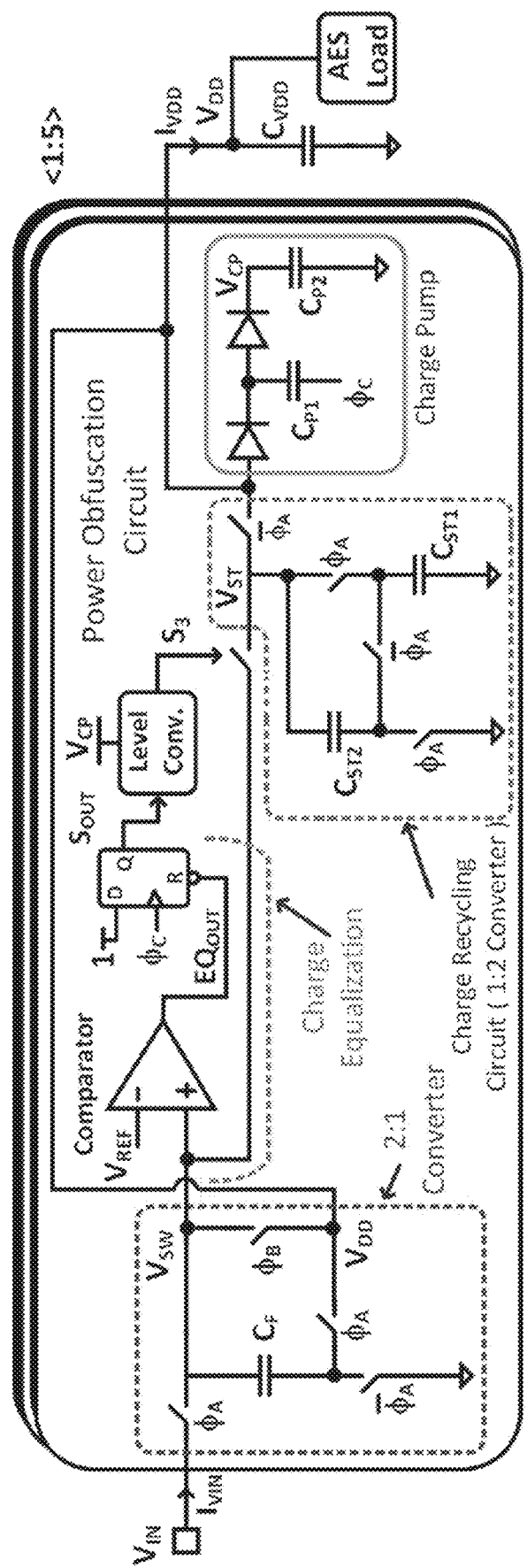
FIG. 2A shows a POSC converter circuit for power obfuscation in accordance with one or more embodiments.

In accordance with one or more embodiments, a POSC converter is disclosed that decreases the loss in efficiency while providing high SCA immunity. An exemplary circuit architecture is shown in FIG. 2A. The POSC converter comprises three sub-blocks: a typical 2:1 converter to power the AES load, a charge-equalization circuit to bring the voltage level of $C_F$ to a fixed $V_{REF}$ value to equalize the charge drawn from $V_{IN}$ in each switching cycle, and a charge-recycling circuit to recycle the extra charge removed from $C_F$ to prevent excessive power loss and improve efficiency.

Figure 2B:
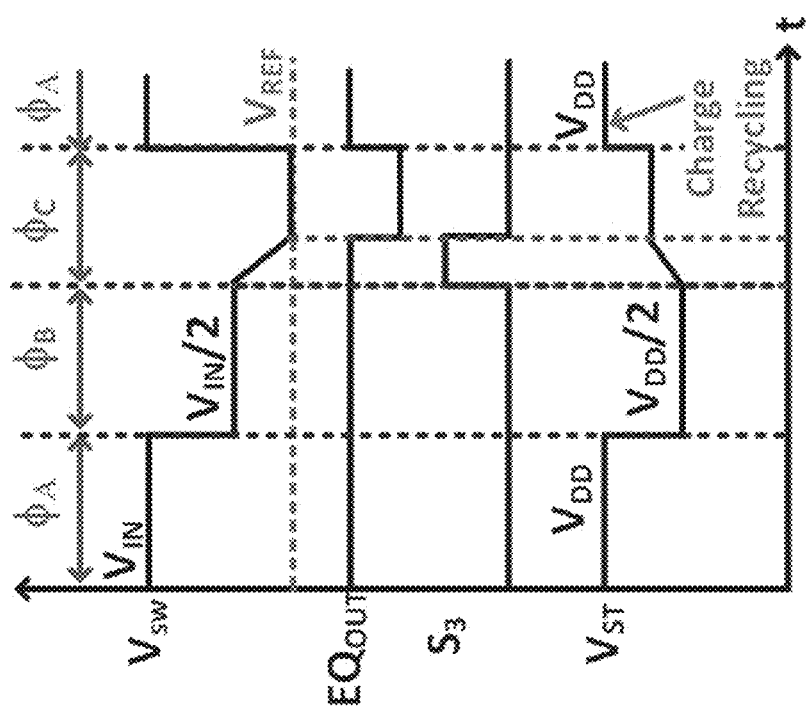
FIG. 2B shows transient waveforms illustrating operation of POSC circuit.

The POSC converter works in three phases $\varnothing_A$, $\varnothing_B$, and $\varnothing_C$. In the first two phases $\varnothing_{A,B}$, the typical 2:1 converter provides the power to the AES load, and the third phase ($\varnothing_C$) is used for power obfuscation. In phase $\varnothing_C$, the equalization circuit and recycling circuit work together. The recycling circuit is made of a 1:2 SC converter on $V_{DD}$ using capacitors $C_{ST1,ST2}$ and the equalization circuit is made of a comparator in a feedback loop for $C_F$. In the beginning of $\varnothing_C$, $C_{ST1}$ and $C_{ST2}$ are staying at $V_{DD}/2$ while $C_F$ is staying at $V_{DD}$. The comparator compares the voltage on $C_F$, $V_{SW}$ with $V_{REF}$ and enables $S_3$, which connects $C_F$ to the parallel combination of $C_{ST1}$ and $C_{ST2}$, which is connected to net $V_{ST}$. Due to the voltage difference between $C_F$ ($V_{DD}$) and $C_{ST1,ST2}$ ($V_{DD}/2$), the charge from $C_F$ flows to $C_{ST1,ST2}$ lowering $V_{SW}$ and raising the level of $V_{ST}$ as shown in FIG. 2B. Once $V_{SW}$ crosses $V_{REF}$, the comparator output goes low and the switch $S_3$ is disabled removing the discharge path, which sets the voltage level of $V_{SW}$ to a fixed value. In the next cycle, $\varnothing_A$, $C_F$ connects to draw charge from $V_{IN}$, while $C_{ST1}$ and $C_{ST2}$ are arranged in a series configuration to dump the extra charge back on to $V_{DD}$. As $C_F$ is always set to a fixed voltage before drawing charge from $V_{IN}$, it will draw same charge in each switching cycle concealing the load information of AES circuit. Also, the $C_{ST1,ST2}$ level was raised in $\emptyset_C$. When they are connected in series, the value of $V_{ST}$ will be higher than $V_{DD}$ and will transfer extra the charge to $V_{DD}$. This way the charge that was removed from $C_F$ is recycled back to $V_{DD}$. Note that owing to the value of $C_{VDD}$ being much larger than $C_{ST1}$, $C_{ST2}$, $V_{DD}$ level will be raised by a small amount. Similarly, large value of $C_{VDD}$ ensures that charge drawn by $C_F$ from $V_{IN}$ has little dependence on $V_{DD}$. The design also uses a charge-pump to realize $2*V_{DD}$ supply and level-converters to generate different control voltages at $V_{DD}$ and $2*V_{DD}$ levels. This is done to avoid using $V_{IN}$ for generating control signals, which can pose a potential leakage point. The design of various circuit blocks for the POSC converter is described below, and key design parameters are given in Table I (FIG. 10).

In the exemplary design, a conventional 2:1 SC converter is modified to prevent leakage of power information to the external node. A $V_{IN}$ of 2V is chosen to generate a $V_{DD}$ of 1V for the AES encryption engine. The converter operates in three phases, $\emptyset_{A,L-H}$, $\emptyset_{B,L-H}$, and $\emptyset_{C,L-H}$, where L-H represents the low and high voltage levels of the control signals driving the gates. For example, in FIG. 3A, $M_1$ is driven by control signal with voltage swing 1V to 2V. The first two phases implement typical operation, and no charge is transferred to the load in the third phase. The load current causes node $V_{DD}$ to charge to a voltage slightly lower than $V_{IN}/2$. The amount of charge transferred to the load depends on the load current and the switching frequency. In steady state, flying capacitor $C_F$ draws only small amount of charge from the input node in each phase $\emptyset_A$. The AES unit requires an average supply current of 6 mA. To provide the high load requirement of the AES, switching frequency of 50 MHz is chosen, and 5 parallel units are used. The converter is shown in FIG. 3A. Thin oxide transistors are used as switches. Deep-nwell transistors are used for $M_3$ and $M_4$ to reduce switch resistance. We selected transistor type and their swing to reduce power consumption and increase efficiency, while ensuring device reliability.

The comparator performs a critical part in charge equalization. It controls switch $S_3$, ensuring $V_{SW}$ is discharged to the same voltage in every cycle. The choice of comparator architecture plays an important role in providing side-channel resilience and not all comparator architectures will fit well for this hardware security task. In the first order of performance, every comparator is expected to turn $S_3$ low when $V_{SW}$ goes below $V_{REF}$. However, nonidealities in comparator performance can create second-order effects which can create small variation in the value of $V_{SW}$ when the comparator output goes low. While significantly attenuated, these variations still carry the switching information of AES and can show side-channel leakage.

Figure 4A:
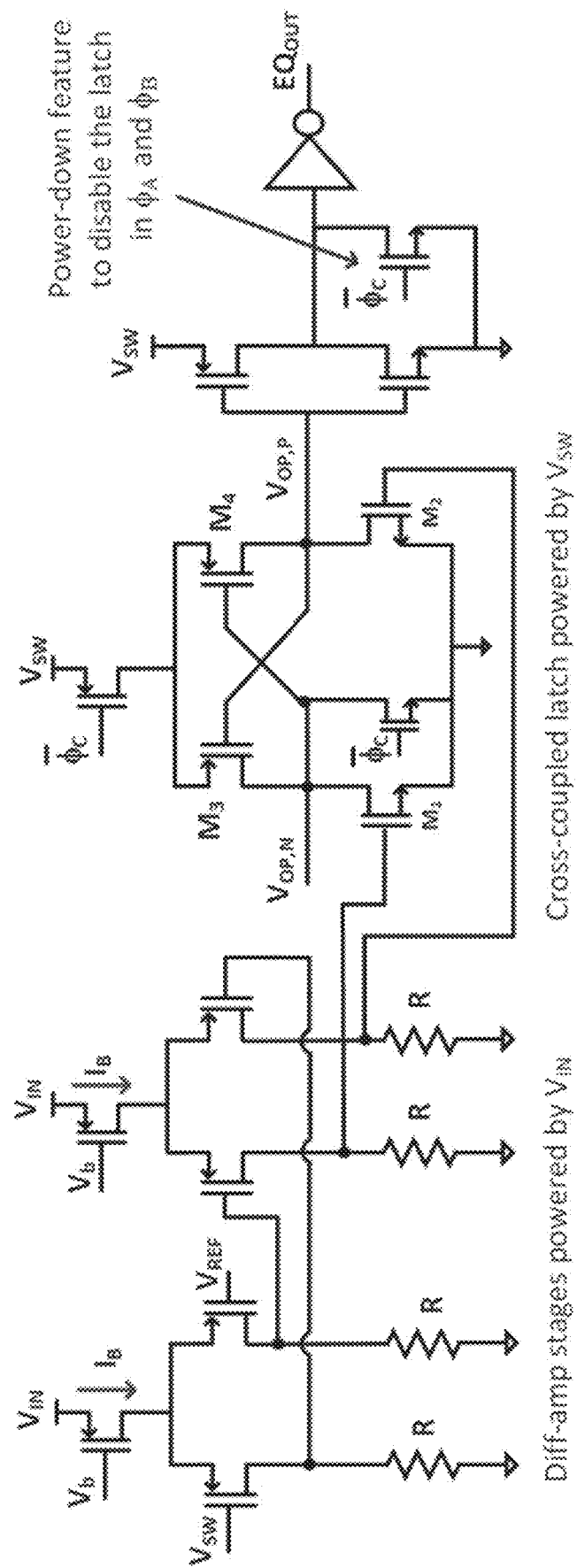
FIG. 4A shows a high speed comparator schematic.

The nonidealities in comparator manifest from the finite gain of the comparator, delay of the comparator (which in many designs depends on the input voltage difference), and power supply rejection ratio (PSRR) (comparator's immunity from variation of $V_{DD}$). We selected the circuit architecture shown in FIG. 4A as it provides very high immunity against side channel leakage. The first two stages of the comparator are made of fully differential resistive load amplifiers. These amplifiers are powered from $V_{IN}$. Due to their fully differential nature, they draw a DC current from $V_{IN}$ independent of $V_{SW}$ value. They provide 38 dB gain and consume 12 µA bias current. The III-stage amplifier includes a cross-coupled latch-stage operating in a positive feedback.

Figures 5A, 5B:
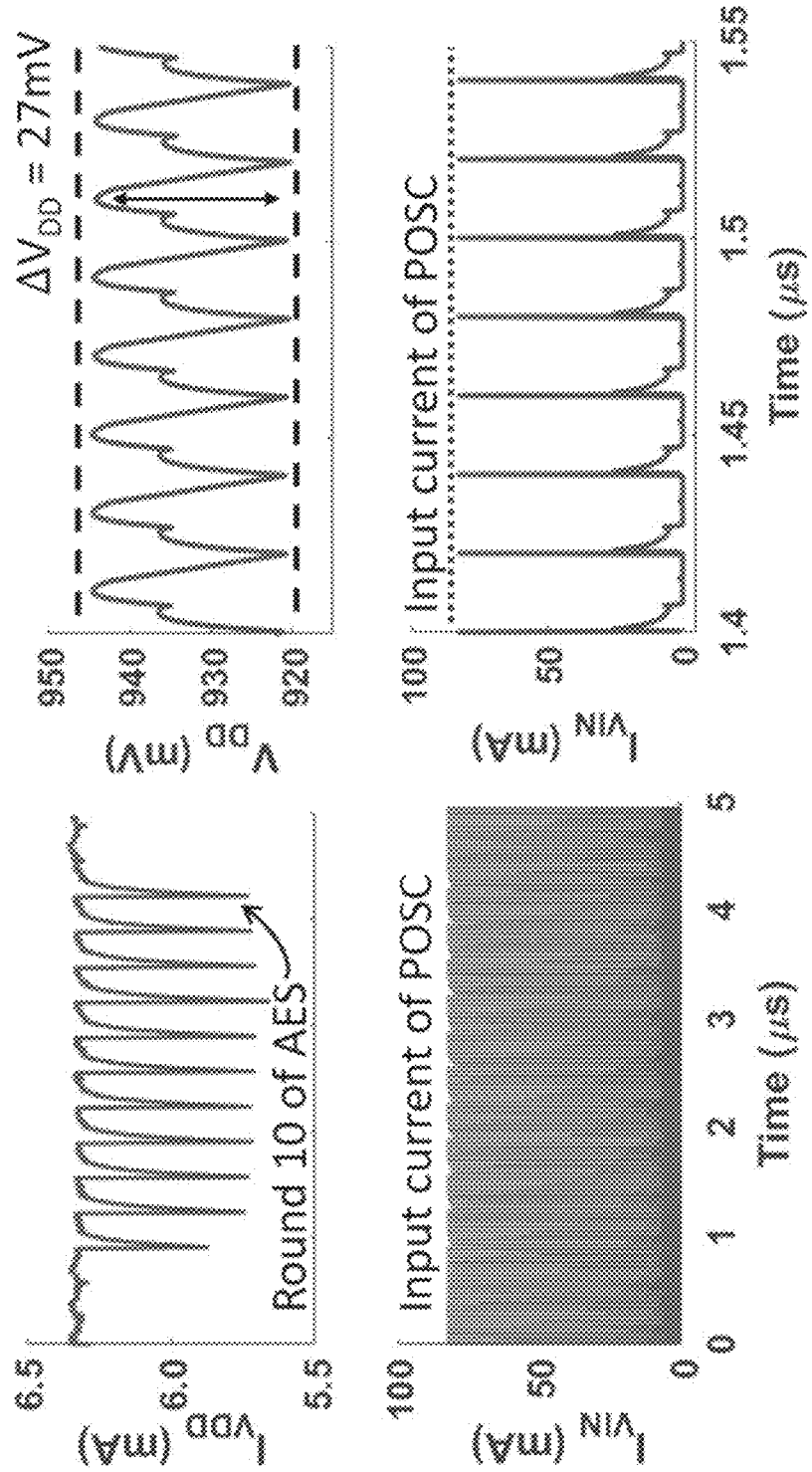
FIG. 5A shows an AES load current and input current at $V_{IN}$.
FIG. 5B shows the supply voltage of AES $V_{DD}$ and input current at $V_{IN}$ showing periodicity.
Figure 6B:
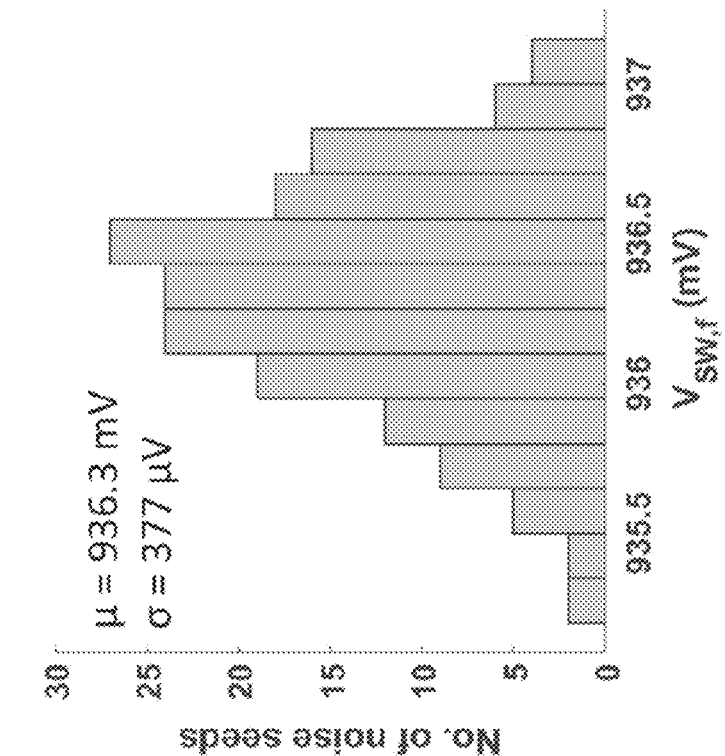
FIG. 6B shows variation of $V_{SW,f}$ with transient noise enabled for a DC load of 6 mA.
Figure 6A:
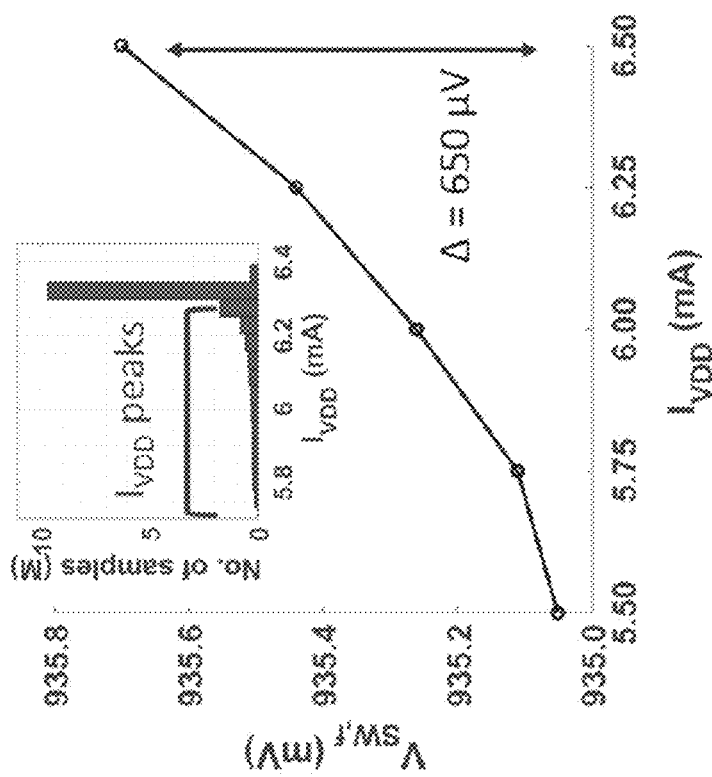
FIG. 6A shows variation of $V_{SW,f}$ with varying DC load current $I_{VDD}$.

The combination of these three stages ensure lower comparator delay. For additional compensation, the cross-coupled stage is also powered from $V_{SW}$. Since the charge on $C_F$ needs to be reduced, it is reused for the cross-coupled stage reducing the overall power consumption. FIG. 5A shows the variation in input current of the POSC with a power trace showing an equalized input current being drawn from $V_{IN}$ obfuscating side-channel leakage. FIG. 6A shows the variation of final value of $V_{SW}$ after equalization in phase $\emptyset_C$. The final value of the switching node $V_{SW,f}$ is close to $V_{REF}$ owing to the charge injection by switch $S_3$ after it switches off. It shows a low variation of less than 650 µV for load variation of 5.5 mA to 6.5 mA.

Noise plays an important role in enhancing the side channel resilience as it adds more randomness to the side channel measurements. We simulated the variation of $V_{SW,1}$ ($V_{SW}$'s final value after charge equalization) at 6 mA load with transient noise enabled and integrated up to 200 MHz. FIG. 6B shows that $V_{SW,f}$ shows standard deviation of 377 µV in the presence of noise. FIG. 6A shows the variation of $V_{SW,f}$ with AES load variation. The AES leakage point corresponds to the load range of 5.5-6.2 mA (inset histogram) corresponding to a $V_{SW,1}$ variation of 400 µV. The level of noise is comparable to $V_{SW,1}$ variation with AES load. Noise will randomize the peak current values, making it difficult to find the correlation between secret key and power consumption preventing side-channel leakage.

Other design considerations for the comparator include the following. (1) Delay: POSC switching frequency is 50 MHz which requires comparator to have small delay. If the comparator delay varies with different load currents, then the amount of charge taken from $C_F$ will vary, making both the timing and power information available at $V_{IN}$. (2) Gain: Small signal gain of the comparator needs to be high to keep the loop gain as close to 1 as possible in the feedback loop. (3) Offset: Input referred offset of the comparator will lead to incorrect tripping point of the comparator which can have adverse effect on the design. In one case when $V_{SW}$ goes lower due to offset, the efficiency will decrease as larger amount of charge is removed. In case when $V_{SW}$ stays higher, then the comparator will not trip in some load scenarios leading to leakage. Proper device sizing or offset correction methods can be used to remove offset. (4) Range of $V_{REF}$: In phase $\emptyset_C$, capacitors $C_F$ and CST are connected together. In the absence of control from the comparator, node $V_{ST}$ reaches a final value of $$V'_{ST} = \frac{C_F}{C_F + C_{ST1} + C_{ST2}} V_{SW} \quad (1)$$

where $V'_{ST}$ is the value of node $V_{ST}$ after being charged for one cycle. Value of $V_{SW}$ is load dependent. Hence, $V_{REF}$ must be in the range of [$V'_{ST}$, $V_{SW}$] for the possible range of load currents. Energy loss of the converter in the first two phases is proportional to $(V_{IN}-V_{REF})^2$, hence a lower value of $V_{REF}$ results in decreased efficiency. The $V_{REF}$ chosen for the SC converter design is 936 mV.

The extra charge from the switching node is stored on storage capacitors in $\emptyset_C$. This extra charge can be shunted to ground to prevent leakage, causing efficiency to drop. We prevent this efficiency degradation by recycling the charge available on the storage capacitors, and putting it back on $V_{DD}$. The charge recycling block is shown in FIG. 2A. In the power obfuscation phase, $C_{ST1}$ and $C_{ST2}$ are connected in parallel to be charged up. In phase $\emptyset_A$, they are reconfigured to be connected in series so as to raise their voltage above $V_{DD}$, to enable charge transfer to $V_{DD}$.

The output of the comparator controls switch $S_3$ in FIG. 2A. The control of switch $S_3$ is designed such that it switches on at the start of phase $\varnothing_C$. The switch is turned off once the comparator output $EQ_{OUT}$ goes down. The use of combinational logic gates is avoided to prevent glitches, which cause the switch to turn on or off before $V_{SW}$ is discharged to $V_{REF}$. Also, the comparator output and control signals operate on a supply of less than $V_{IN}/2$, which is the voltage reached by $C_F$ in phases $\varnothing_B$ and $\varnothing_C$. This voltage is too low to drive the gate of switch $S_3$. Hence, a level converter is designed to shift the control logic output voltage level from $V_{DD}$ to 2V level. The level converter is shown in FIG. 3B.

Switch $S_3$ in the charge equalization block requires a 2V control voltage to switch on. $S_3$ is directly controlled by the level converter. If the level converter is supplied by the external power $V_{IN}$, power information will be leaked out. Hence, the level converter needs its own internal supply. This is provided by a two stage charge pump shown in FIG. 2A. The input of the charge pump is provided by $V_{DD}$, which is close to 1V, and an output voltage of 1.65V is obtained, which is enough to drive switch $S_3$ implemented using deep-nwell n-MOS.

Our evaluation of the proposed POSC converter includes its performance evaluation as a power supply as well as its resilience against side channel leakage.

Figures 7A, 7B:
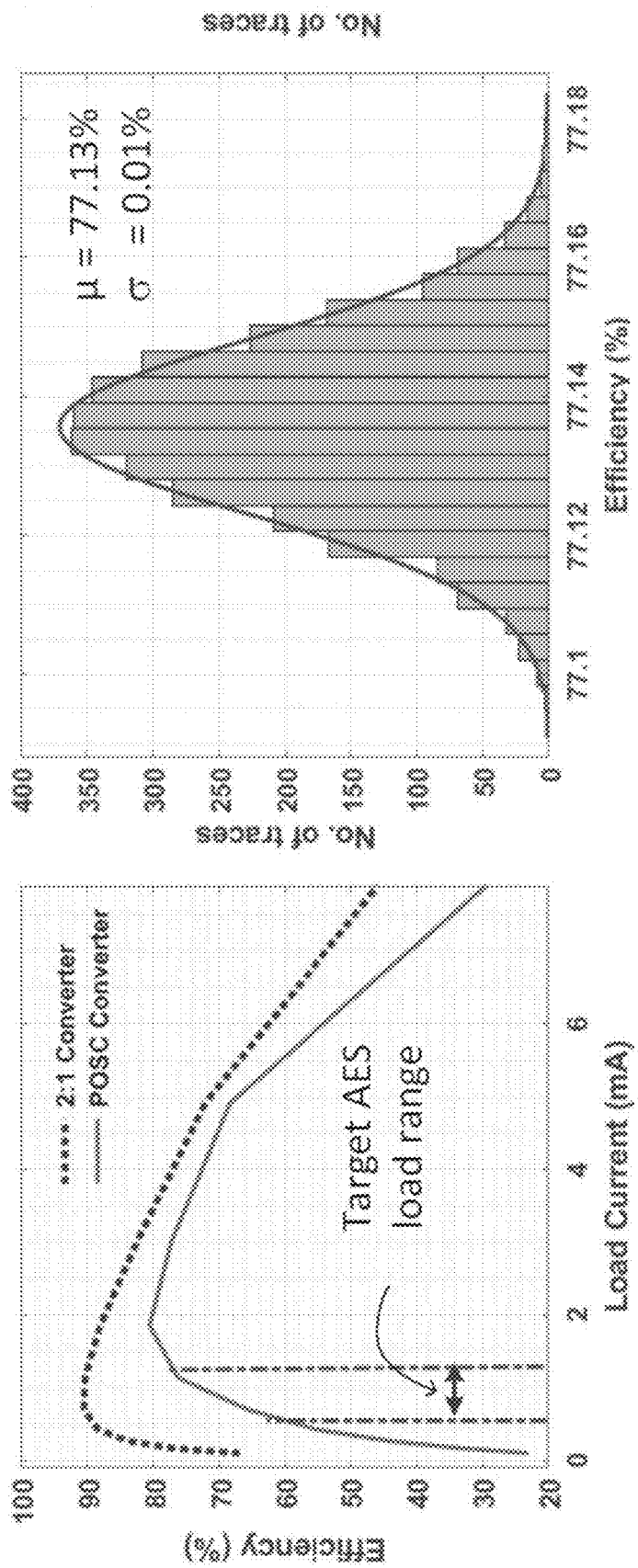
FIG. 7A shows the efficiency vs. load variation of a 2:1 converter and POSC converter.
FIG. 7B shows a histogram of efficiency of the POSC converter for 5 k power traces.
Figure 7C:
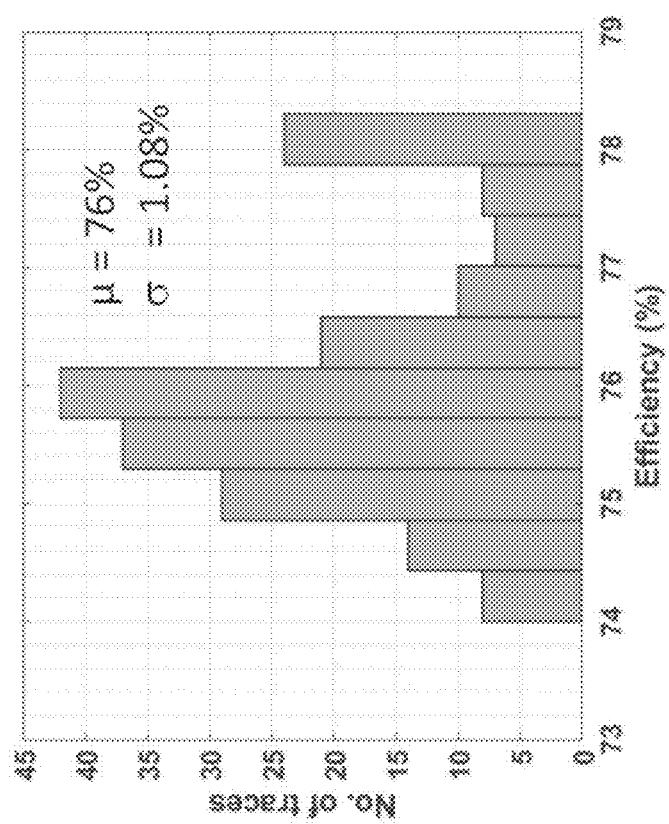
FIG. 7C shows a histogram of efficiency of the POSC converter with process variation for 200 samples.

We designed POSC converter in 65 nm CMOS with a switching frequency of 50 MHz. It combines 5 parallel converters each optimized to drive 1.2 mA load to target a 6 mA AES load. FIG. 7A shows the variation of efficiency (ii) for a regular 2:1-converter with peak$_{11}$ of 90% along with POSC with power obfuscation feature enabled. FIG. 5B shows the switching noise of 27 mV on AES $V_{DD}$. FIG. 7B shows the variation of POSC efficiency across 5000 power traces of AES load where it achieves an efficiency of 77.1%. FIG. 7C shows the efficiency variation of the POSC converter across statistical process variation showing a 3-σ variation of 3%. We designed POSC converter as a regular 2:1 SC converter with power side-channel leakage obfuscation capability. The area overhead of the design manifests due to area of the comparator, charge-pump, 1:2 converter, and the control circuit which are part of charge equalization. The area of these circuits incur an overhead of 14% over the design of the 2:1 converter.

The POSC converter was tested with power traces obtained from an unmasked AES implementation on a Sasebo-GII board, with a Xilinx Virtex-5 FPGA. The traces are acquired sing an Agilent MSOX4104A oscilloscope with the AES system running at 3 MHz.

To recover the last-round AES key from the power traces byte by byte, we performed correlation power analysis (CPA) [18] with a power model of Hamming distance between the output cipher byte and the last round input state byte. The most leaky time-point is at 4.226 µs, and CPA is applied on power values at this point from all the traces. By finding the maximum correlation between the power consumption values and the predicted power values under different key byte guesses, the correct key byte value is retrieved.

Figure 9B:
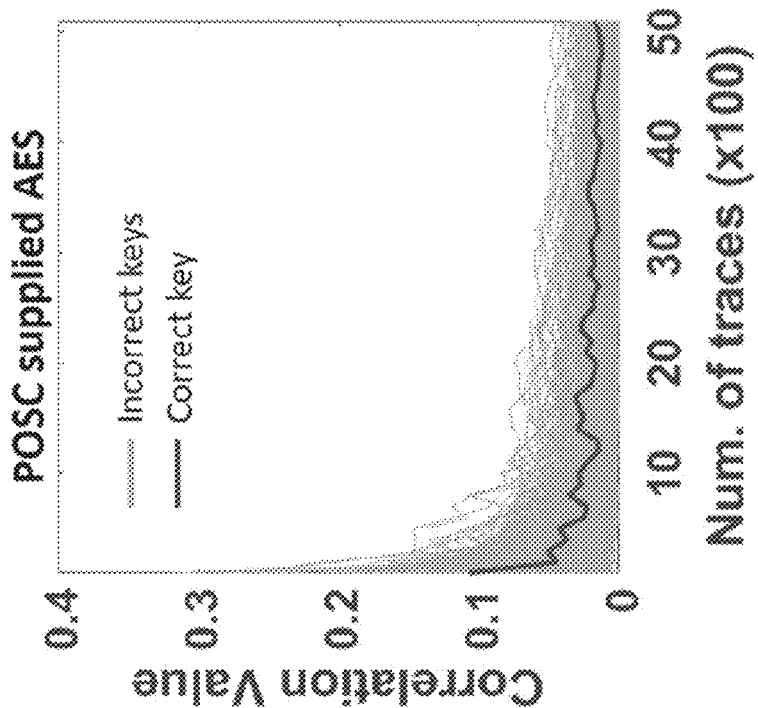
FIGS. 9A and 9B show the correlation coefficient of correct and incorrect keys as a function of number of traces.
Figure 9A:
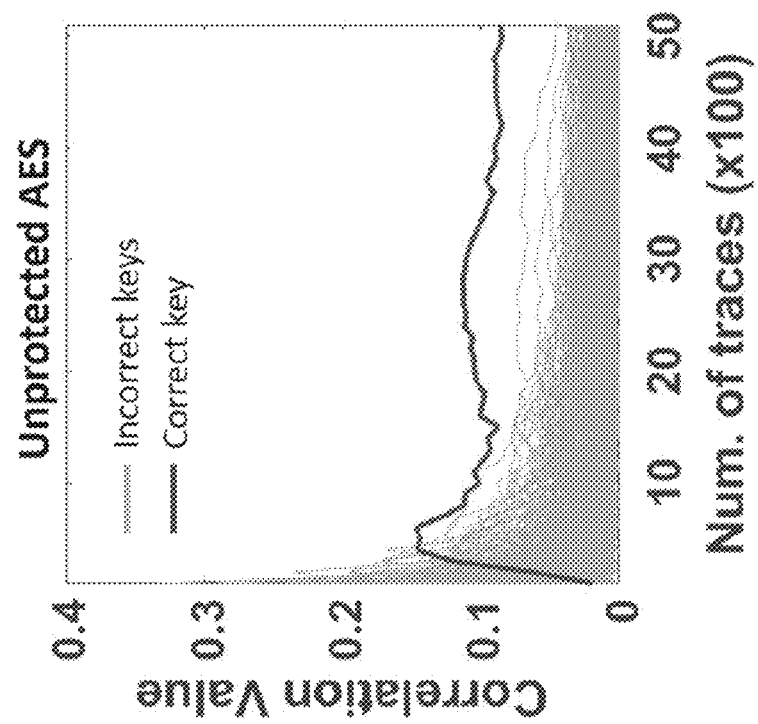

When the FPGA was powered using a DC supply, it was found that 100 power traces were sufficient to recover the key bytes. FIGS. 8A and 8B show the time-domain plot for correlation values under different key byte values for byte index 1. At time point 4.226 µs, the highest correlation is 0.11. The CPA result can be seen in FIG. 9A, with the MTD (measurements to disclosure) of 100 traces. Limited by the prohibitively long simulation time of the POSC converter, 5 k power traces were evaluated for leakage. When the AES unit is powered from the POSC converter, the key cannot be extracted even with 5000 traces, as seen in FIG. 9B. The equivalent noise current sampled at the input $V_{IN}$ is estimated from the noise variation seen at $V_{SW_f}$ (FIG. 6B). One-third of that noise is added to the traces prior to CPA evaluation for a pessimistic estimate. To introduce noise in the traces, normally distributed random numbers were generated with a specified standard deviation that is equivalent to the RMS value of the noise to be added. This noise is then added directly to the power traces to account for the device noise generated by the POSC converter design components.

Table II (FIG. 11) compares an exemplary POSC converter in accordance with one or more embodiments with state-of-the-art power side channel resilient hardware designs. Compared to the state-of-the-art integrated power supply solutions with side channel leakage resilience, simulation result of our work indicates that POSC can achieve a higher efficiency of over 6% compared to [17] with highest reported efficiency of 77%. The power overhead is significantly lower than non-voltage regulator SCA resilient designs [7], [8], [14]. Our area overhead of 14% is comparable to other solutions. In a simulation environment, we performed the CPA attack on the protected design. Under CPA attack an unprotected design would leak key within 100 traces. The POSC has not shown any leakage after evaluating 5 k traces which was limited due to long SPICE simulation time associated with SCA evaluations.

In summary, disclosed herein is a new design of 2:1 switched capacitor DC-DC converter, which incorporates power obfuscation technique to protect against SCA. A charge equalization circuit ensures that the flying capacitor is always charged from a fixed voltage level, which prevents internal switching patterns to leak outside. A charge recycling technique recycles the extra charge drawn from the flying capacitor back to the AES supply improving the efficiency of the converter. One exemplary embodiment achieved an efficiency of 77% with an area overhead of 14%. SPICE simulation based CPA on the converter showed no side channel leakage when 5 k-traces were evaluated.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

Accordingly, the foregoing description and attached drawings are by way of example only, and are not intended to be limiting.

REFERENCES

[1] P. Kocher, J. Jaffe, and B. Jun, "Differential power analysis," in Advances in Cryptology—CRYPTO' 99, pp. 388-397, 1999.

[2] D. J. Bernstein, "Cache-timing attacks on AES," tech. rep., University of Illinois at Chicago, 2005.
[3] A. Dehbaoui, V. Lomne, P. Maurine, L. Tones, and M. Robert, "Enhancing electromagnetic attacks using spectral coherence based cartography," VLSI-SoC: Technologies for Systems Integration, pp. 135-155, 2011.
[4] N. Kamoun, L. Bossuet, and A. Ghazel, "Experimental implementation of DPA attacks on AES design with flash-based FPGA technology," in SSD, pp. 1-4, March 2009.
[5] C. Luo, Y. Fei, and D. Kaeli, "Effective simple-power analysis attacks of elliptic curve cryptography on embedded systems," in ICCAD, 2018.
[6] C. Luo, Y. Fei, L. Zhang, A. A. Ding, P. Luo, S. Mukherjee, and D. Kaeli, "Power analysis attack of an AES GPU implementation," J. Hardware & System Security, 2008.
[7] S. Lu, Z. Zhang, and M. Papaefthymiou, "1.32 GHz high-throughput charge-recovery AES core with resistance to DPA attacks," in VLSI Circuits, pp. C246-C247, 2015.
[8] C. Tokunaga and D. Blaauw, "Securing encryption systems with a switched capacitor current equalizer," JSSC, pp. 23-31, 2010.
[9] N. Miura, D. Fujimoto, R. Korenaga, K. Matsuda, and M. Nagata, "An intermittent-driven supply-current equalizer for 11× and 4× power-overhead savings in cpa-resistant 128 bit aes cryptographic processor," in A-SSCC, pp. 225-228, November 2014.
[10] M. Kar, D. Lie, M. Wolf, V. De, and S. Mukhopadhyay, "Impact of inductive integrated voltage regulator on the power attack vulnerability of encryption engines: A simulation study," in CICC, pp. 1-4, 2014.
[11] M. Kar, A. Singh, S. Mathew, A. Rajan, V. De, and S. Mukhopadhyay, "Exploiting fully integrated inductive voltage regulators to improve side channel resistance of encryption engines," in ISLPED, p. 130-135, 2016.
[12] A. Singh, M. Kar, A. Rajan, V. De, and S. Mukhopadhyay, "Integrated all-digital low-dropout regulator as a countermeasure to power attack in encryption engines," in HOST, pp. 145-148, 2016.
[13] D. Das, S. Maity, S. B. Nasir, S. Ghosh, A. Raychowdhury, and S. Sen, "High efficiency power side-channel attack immunity using noise injection in attenuated signature domain," in HOST, pp. 62-67, 2017.
[14] D. Das, J. Danial, A. Golder, S. Ghosh, A. R. Wdhury, and S. Sen, "Deep learning side-channel attack resilient aes-256 using current domain signature attenuation in 65 nm CMOS," in CICC, pp. 1-4, 2020.
[15] A. Singh, M. Kar, V. C. K. Chekuri, S. K. Mathew, A. Rajan, V. De, and S. Mukhopadhyay, "Enhanced Power and Electromagnetic SCA Resistance of Encryption Engines via a Security-Aware Integrated All-Digital LDO," JSSC, vol. 55, no. 2, pp. 478-493, 2020.
[16] D. Das, S. Maity, S. B. Nasir, S. Ghosh, A. Raychowdhury, and S. Sen, "ASNI: Attenuated Signature Noise Injection for Low-Overhead Power Side-Channel Attack Immunity," TCAS-I, vol. 65, no. 10, pp. 3300-3311, 2018.
[17] A. Singh, M. Kar, S. Mathew, A. Rajan, V. De, and S. Mukhopadhyay, "Exploiting on-chip power management for side-channel security," in DATE, pp. 401-406, 2018.
[18] E. Brier, C. Clavier, and F. Olivier, "Correlation power analysis with a leakage model," in CHES, pp. 16-29, 2004.

The invention claimed is:

1. A power obfuscation switched capacitor (POSC) converter operable in a plurality of switching cycles for concealing power consumption by an encryption unit load, each of said switching cycles comprising a first phase, a second phase, and a third phase, the POSC converter, comprising:
a switched capacitor converter including a flying capacitor for drawing charge from an input voltage in the first phase to power the encryption unit load in the second phase;
a charge-equalization circuit coupled to the switched capacitor converter and configured to bring a voltage level of the flying capacitor to a fixed reference voltage value by extracting charge from the flying capacitor in the third phase to equalize the charge drawn by the switched capacitor converter from the input voltage in each switching cycle; and
a charge-recycling circuit coupled to the switched capacitor converter and the charge-equalization circuit to store and recycle the charge extracted from the flying capacitor in the third phase to reduce power loss and improve efficiency.

2. The POSC converter of claim 1, wherein the encryption unit load is an Advanced Encryption Standard (AES) unit load.

3. The POSC converter of claim 1, wherein the equalization circuit includes a comparator in a feedback loop for the flying capacitor.

4. The POSC converter of claim 3, wherein the comparator compares a voltage on the flying capacitor with the fixed reference voltage to determine when the voltage level of the flying capacitor reaches the fixed reference voltage.

5. The POSC converter of claim 3, further comprising a level converter for providing a fixed control voltage to drive a switch controlled by the comparator.

6. The POSC converter of claim 5, further comprising a charge pump acting as a power supply for the level converter.

7. The POSC converter of claim 1, wherein the charge-recycling circuit includes one or more storage capacitors to store the charge extracted from the flying capacitor.

8. The POSC converter of claim 7, wherein the one or more storage capacitors comprise storage capacitors configured to be connected in parallel in the third phase to be charged and connected in series in the first phase to enable charge transfer to a supply voltage of the encryption unit load.

9. The POSC converter of claim 1, wherein the switched capacitor converter is a 2:1 switched capacitor converter and the charge-recycling circuit includes a 1:2 switched capacitor converter.

10. The POSC converter of claim 1, wherein the POSC converter is integrated in an on-chip power supply.

11. A method for concealing power consumption by an encryption unit load using a power obfuscation switched capacitor (POSC) converter operable in a plurality of switching cycles, each of said switching cycles comprising a first phase, a second phase, and a third phase, the method comprising the steps of:
(a) drawing charge by a switched capacitor converter having a flying capacitor from an input voltage in the first phase to power the encryption unit load in the second phase;
(b) bringing a voltage level of the flying capacitor to a fixed reference voltage value by extracting charge from the flying capacitor in the third phase to equalize the charge drawn by the switched capacitor converter from the input voltage in each switching cycle using a charge-equalization circuit; and (c) storing and recycling the charge extracted from the flying capacitor using a charge-recycling circuit in the third phase to reduce power loss and improve efficiency.

12. The method of claim 11, wherein the encryption unit load is an Advanced Encryption Standard (AES) unit load.

13. The method of claim 11, wherein the equalization circuit includes a comparator in a feedback loop for the flying capacitor.

14. The method of claim 13, wherein step (b) includes comparing a voltage on the flying capacitor with the fixed reference voltage using the comparator to determine when the voltage level of the flying capacitor reaches the fixed reference voltage.

15. The method of claim 13, further comprising providing a fixed control voltage to drive a switch controlled by the comparator using a level converter.

16. The method of claim 15 further comprising using a charge pump as a power supply for the level converter.

17. The method of claim 11, further comprising storing the charge extracted from the flying capacitor using one or more storage capacitors in the charge-recycling circuit.

18. The method of claim 17, wherein the one or more storage capacitors comprise storage capacitors configured to be connected in parallel in the third phase to be charged and connected in series in the first phase to enable charge transfer to a supply voltage of the encryption unit load.

19. The method of claim 11, wherein the switched capacitor converter is a 2:1 switched capacitor converter and the charge-recycling circuit includes a 1:2 switched capacitor converter.

20. The method of claim 11, wherein the POSC converter is integrated in an on-chip power supply.

* * * * *